(12) United States Patent
Kuwazawa

(10) Patent No.: US 7,847,984 B2
(45) Date of Patent: Dec. 7, 2010

(54) LINE SENSOR AND IMAGE INFORMATION READING APPARATUS

(75) Inventor: Kazunobu Kuwazawa, Sakata (JP)

(73) Assignee: Seiko Epson Corporation (JP)

( * ) Notice: Subject to any disclaimer, the term of this patent is extended or adjusted under 35 U.S.C. 154(b) by 936 days.

(21) Appl. No.: 11/686,518

(22) Filed: Mar. 15, 2007

(65) Prior Publication Data
US 2007/0216793 A1    Sep. 20, 2007

(30) Foreign Application Priority Data
Mar. 17, 2006    (JP) .............................. 2006-074104

(51) Int. Cl.
   *H04N 1/04*    (2006.01)
(52) U.S. Cl. ....................... 358/474; 358/483
(58) Field of Classification Search ................. 358/474, 358/475, 482, 483, 494, 505, 513, 514, 530; 348/294, 311, 315
See application file for complete search history.

(56) References Cited

U.S. PATENT DOCUMENTS

| | | | | |
|---|---|---|---|---|
| 6,115,147 A | * | 9/2000 | Mizumoto et al. | 358/483 |
| 6,249,360 B1 | * | 6/2001 | Pollard et al. | 358/473 |
| 7,425,951 B2 | * | 9/2008 | Fukushima et al. | 345/419 |
| 2004/0017492 A1 | * | 1/2004 | Stavely | 348/240.2 |
| 2008/0043123 A1 | * | 2/2008 | Shimomura et al. | 348/240.2 |

FOREIGN PATENT DOCUMENTS

| | | |
|---|---|---|
| JP | 05-103152 | 4/1993 |
| JP | 05-110054 | 4/1993 |
| JP | 07-079403 | 3/1995 |
| JP | 09-083729 | 3/1997 |
| JP | 09-224118 | 8/1997 |
| JP | 3013189 | 12/1999 |

* cited by examiner

*Primary Examiner*—Gabriel I Garcia
(74) *Attorney, Agent, or Firm*—Harness, Dickey & Pierce, P.L.C.

(57) ABSTRACT

A line sensor, includes a plurality of pixels which is arranged linearly, the number of the plurality of pixels including the number depending on a resolution, a first pixel group which is provided to a center portion of the plurality of pixels arranged linearly and has a pixel pitch shorter than a length corresponding to a pixel pitch calculated from the resolution, and a second pixel group which is provided to each of both side portions of the center portion, and has a pixel pitch longer than the length corresponding to the pixel pitch calculated from the resolution.

10 Claims, 5 Drawing Sheets

LINE SENSOR AND IMAGE INFORMATION READING APPARATUS

The entire disclosure of Japanese Patent Application No. 2006-074104, filed Mar. 17, 2007 is expressly incorporated by reference herein.

BACKGROUND OF THE INVENTION

1. Technical Field

The present invention relates to a line sensor and an image information reading apparatus.

2. Related Art

There have been solid state imaging devices such as a charge coupled device (CCD) sensor and a complementary metal-oxide semiconductor (CMOS) sensor. A line sensor of the solid state imaging device has been used widely for a scanner, a copier, a facsimile and the like. The solid state imaging device has a plurality of photodiodes which generate charge when exposed to light, and functions as a photoelectric conversion element. The photodiodes are formed in an area (hereinafter, referred to as a "photodiode-formed area") having one side adjacent to which is provided a charge transfer section such as a CCD. For example, when photo-generated charge is generated at each of the photodiodes, an amount of the photo-generated charge is transferred to the charge transfer section via a transfer gate. The photo-generated charge is transferred by the charge transfer section and then read by a reading section as an image signal.

In a case of a scanner having the line sensor mounted thereon, for example, a plurality of line sensor chips as a semiconductor chip are arranged linearly and used. For the line sensor chips arranged, various techniques have been proposed in order to maintain a resolution and prevent an image from being distorted in a gap between the chips.

There are three techniques, for example, for the plurality of the line sensor chips arranged linearly. A first technique is that in each of the chips an interval between a pixel at an end of the chip and an inner adjacent pixel is smaller than an interval between the remaining intermediate pixels thereof (refer to the section "related art" of a first example of related art, listed below, for example). A second technique is that each chip has an array of pixels arranged at a given constant pitch which is set slightly smaller than a reading pitch determined depending on a resolution standard (refer to the first example of related art, for example).

According to the first example of related art, the interval between the pixel at the end of the chip and the inner adjacent pixel is smaller than the interval between the remaining intermediate pixels, the gap between the chips (hereinafter, referred to as a "chip gap") with absence of pixel is interpolated to prevent image distortion. However, output of the pixel at the end of the chip disadvantageously becomes uneven. In order to solve this disadvantage, the second technique is proposed in which the pixels are arranged in each chip at the given constant pitch which is set slightly smaller than the reading pitch determined depending on the resolution standard.

A third technique is proposed in which an interval between a light receiving element at an end of the chip and an inner adjacent one thereof is wider than that between the remaining light receiving elements (refer to a second example of related art, listed below, for example). At the chip gap of two adjacent chips a distance between the light receiving elements at each of the ends thereof is longer than that of the remaining light receiving elements in one chip. According to the third technique, it is possible to prevent abrupt occurrence of a pitch discontinuity of the light receiving element due to such a condition.

Japanese Patent No. 3013189 (FIG. 2 and FIG. 4) is the first example of related art.

JP-B-7-79403 is the second example of related art.

In the second technique above, unevenness of output of the pixel at the end of the chip is improved, and the number of the pixels of the whole line sensors is kept as it is. However, the image distortion occurs undesirably at the chip gap.

In addition, according to the third technique, since the abrupt occurrence of the pitch discontinuity of the light receiving element is eliminated, the image distortion is reduced. However, there is a problem that, if the light receiving element at the end of the chip is damaged by mechanical shock in a dicing process, as a result, the image distortion occurs.

An advantageous of the present invention is to provide a line sensor which suppresses the image distortion due to the presence of the chip gap.

A line sensor of a first aspect of the invention includes a plurality of pixels which is arranged linearly, the number of the plurality of pixels including the number depending on a resolution, a first pixel group which is provided to a center portion of the plurality of pixels arranged linearly and has a pixel pitch shorter than a length corresponding to a pixel pitch calculated from the resolution, and a second pixel group which is provided to each of both side portions of the center portion, and has a pixel pitch longer than the length corresponding to the pixel pitch calculated from the resolution.

With this configuration, the line sensor can be achieved which suppresses the image distortion owing to the presence of the chip gap.

In the line sensor of the first aspect of the invention, the number of the plurality of pixels is preferably equal to the number depending on the resolution With this configuration, the line sensor can be achieved which has a resolution the same as that required.

The line sensor of the first aspect of the invention preferably includes a third pixel group. The third pixel group is provided between the center portion and each of the both side portions, and has a pixel pitch equal to the length corresponding to the pixel pitch calculated from the resolution.

The line sensor of the first aspect of the invention preferably includes a third pixel group. The third pixel group is provided between the center portion and each of the both side portions, and has a pixel pitch shorter than the length corresponding to the pixel pitch calculated from the resolution and longer than a length of the pixel pitch of the center portion.

The line sensor of the first aspect of the invention preferably includes a third pixel group. The third pixel group is provided between the center portion and each of the both side portions, and has a pixel pitch longer than the length corresponding to the pixel pitch calculated from the resolution and shorter than a length of the pixel pitch of the both side portions.

With this configuration, the line sensor can be achieved which further suppresses the image distortion owing to the presence of the chip gap.

A line sensor of a second aspect of the invention includes a plurality of pixels which is arranged linearly, the number of the plurality of pixels including the number depending on a resolution. The plurality of pixels are arranged linearly so that the pixel pitch is gradually increased from a center portion of the pixels arranged toward both end portions thereof.

With this configuration, the line sensor can be achieved which suppresses the image distortion owing to the presence of the chip gap.

In the line sensor of the second aspect of the invention, the pixel pitch is preferably changed continuously from the center portion toward the both end portions so as to be increased gradually.

In the line sensor of the second aspect of the invention, the pixel pitch is preferably changed stepwise from the center portion toward the both end potions so as to be increased gradually.

With these configuration, the line sensor can be achieved which further suppresses the image distortion owing to the presence of the chip gap.

A line sensor of a third aspect of the invention includes a plurality of pixels which is arranged linearly, the number of the plurality of pixels including the number depending on a resolution, a first pixel group which is provided to a center portion of the plurality of pixels arranged linearly and has a pixel pitch longer than a length corresponding to a pixel pitch calculated from the resolution, and a second pixel group which is provided to each of both side portions of the center portion, and has a pixel pitch equal to the length corresponding to the pixel pitch calculated from the resolution.

With this configuration, the line sensor can be achieved which suppresses the image distortion owing to the presence of the chip gap.

The line sensor of the third aspect of the invention preferably includes a third pixel group. The third pixel group which is provided between the center portion and each of the both side portions, and has a pixel pitch shorter than the length corresponding to the pixel pitch calculated from the resolution and longer than a length of the pixel pitch of the center portion.

With this configuration, the line sensor can be achieved which further suppresses the image distortion owing to the presence of the chip gap.

An image information reading apparatus according to one of embodiments of the invention includes the above-described line sensor.

With this configuration, the line sensor can be achieved which suppresses the image distortion owing to the presence of the chip gap.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings.

First Embodiment

Figure 1:
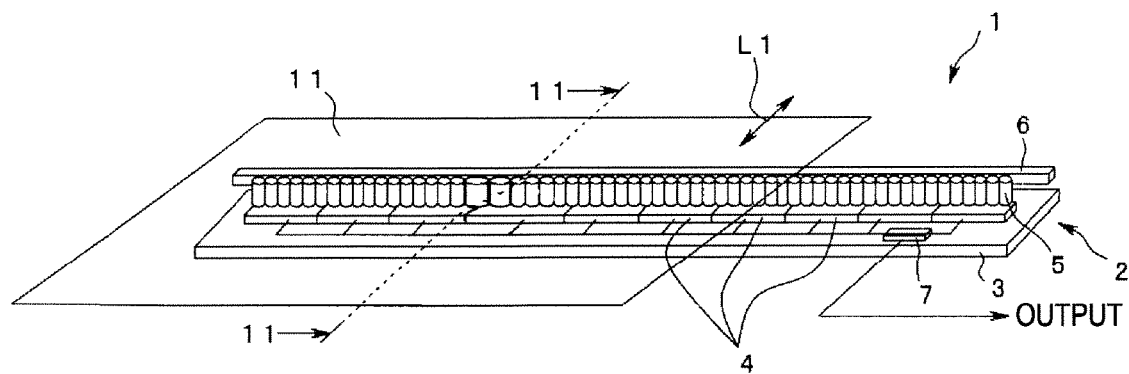
FIG. 1 is a structural view showing a configuration of an image information reading apparatus according to a first embodiment of the invention.
Figure 2:
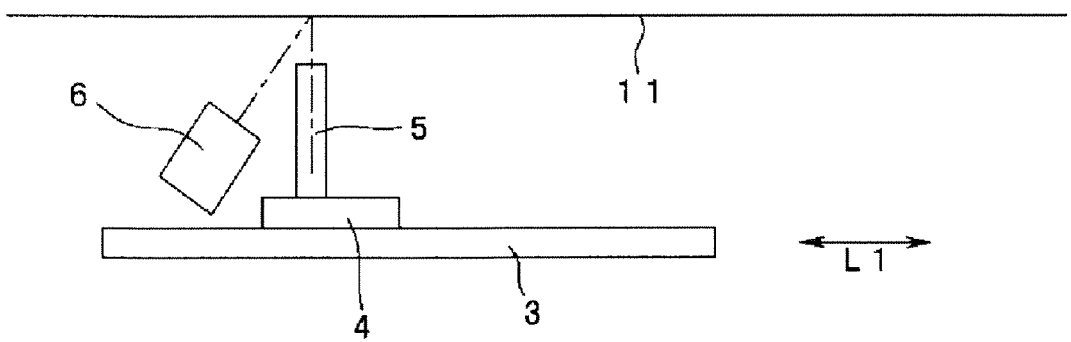
FIG. 2 is a schematic cross-sectional view explaining a reading mechanism of the image information reading apparatus shown in FIG. 1.

Firstly, described is a configuration of an image information reading apparatus as an electronic apparatus using a line sensor according to a first embodiment on the basis of FIG. 1. FIG. 1 is a structural view showing the configuration of the image information reading apparatus according to the first embodiment. FIG. 2 is a schematic cross-sectional view showing a reading mechanism of the image information reading apparatus shown in FIG. 1.

Referring to FIG. 1, an image information reading apparatus 1 has a line sensor unit 2. The line sensor unit 2 has an elongate board substrate 3 formed thereon with a plurality of line sensor chips 4 arranged linearly in a longitudinal axis direction of the substrate 3. Each of the plurality of line sensor chips 4 has a plurality of light receiving elements (hereinafter, referred to also as a "pixel"). The plurality of line sensor chips 4 are linearly disposed on the substrate 3 so that the plurality of pixels on each of the chips align linearly. The line sensor unit 2 is provided with a plurality of lenses 5. The plurality of lenses 5 are disposed on the line sensor chips 4 so that each of the lenses positions at a position corresponding to each of the pixels on the line sensor chips 4. The plurality of lenses 5 are a plurality of SELFOC lens arrays, for example. The line sensor unit 2 is provided with an elongate lamp 6 as a light source device. The substrate 3 is provided thereon with an output circuit 7 which outputs sequentially a pixel signal from the plurality of line sensor chips 4 to an external image signal processing circuit (not shown).

The image information reading apparatus 1 includes therein a moving unit (not shown) by means of which the line sensor unit 2 can move in a direction L orthogonal to the longitudinal axis direction of the substrate 3. The image information reading apparatus 1 has a transparent plate (not shown) such as a glass plate on which is placed in contact therewith a sheet of paper 11 as a medium of image information to be scanned. The plurality of line sensor chips 4 arranged linearly receive reflected light from a surface of the sheet of paper 11 when the line sensor unit 2 moving.

Referring to FIG. 2, the line sensor unit 2 moves along the predetermined direction L1, keeping a predetermined distance from the surface of the sheet of paper 11 on which the image information is recorded. While the line sensor moving in this way, the light from the lamp 6 is reflected from the surface of the sheet of paper 11, and received through the lenses 5 by the plurality of line sensor chips 4. As a result, the line sensor unit 2 can read the image information while scanning the sheet of paper 11.

Figure 3:
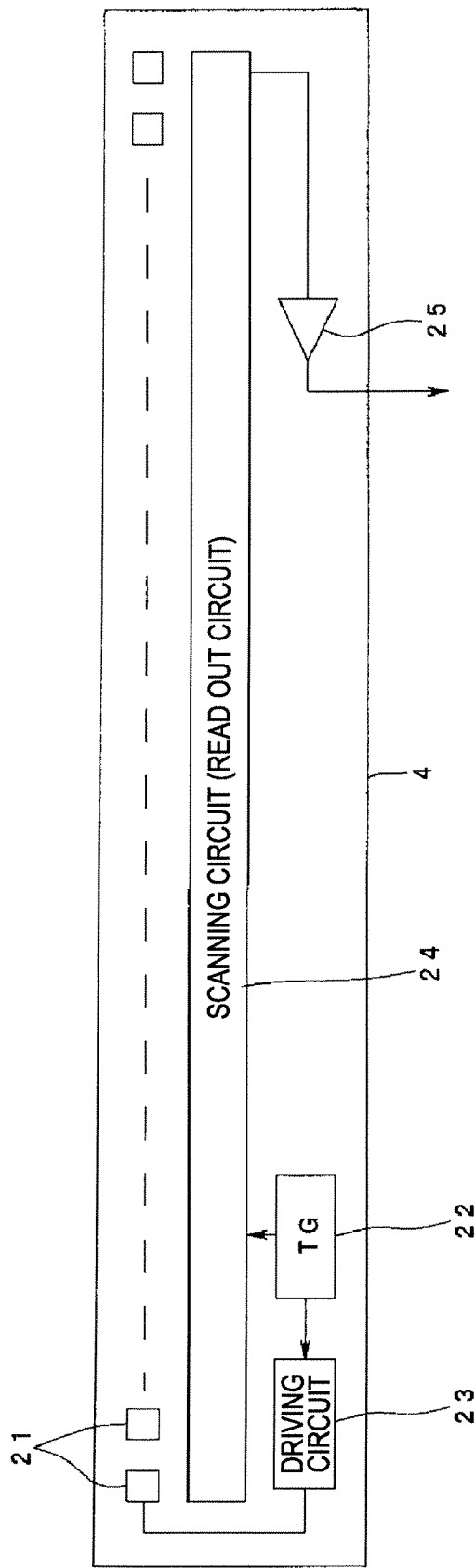
FIG. 3 is a schematic plan view of a line sensor chip according to the first embodiment.

FIG. 3 is a schematic plan view explaining a configuration of one of the line sensor chips. The line sensor chip 4 has the plurality of light receiving elements, that is, the plurality of pixels 21. The plurality of pixels 21 are formed and arranged in a line or linearly on a surface of the line sensor chip 4 with different intervals therebetween, as described later. The linearly arrangement of the pixels means not only that the pixels are arranged in one line but also that the pixels are arranged in three lines. In the case of the arrangement of the pixels in three lines, a reading operation is performed as an RGB sensor by use of white light illumination.

The line sensor chip 4 has a timing generator (TG) 22 as a timing signal generating circuit, a driving circuit 23 for driving each of the pixels 21, a scanning circuit 24 for scanning and reading out a pixel signal from the pixel 21, an amplifier 25 for amplifying the pixel signal from the scanning circuit 24 and output the amplified signal. The output signal from the amplifier 25 is supplied to the output circuit 27 described above.

Therefore, in the image information reading apparatus 1, various signals from a control unit (not shown) are supplied to the line sensor unit 2 and the moving unit (not shown). The line sensor unit 2, after receiving the various signals, generates a predetermined control signal inside thereof, drives the line sensor chip 4, reads out an image signal, and outputs the image signal. As a result, the image information reading apparatus 1 reads the image information of the sheet of paper 11.

Figure 4:
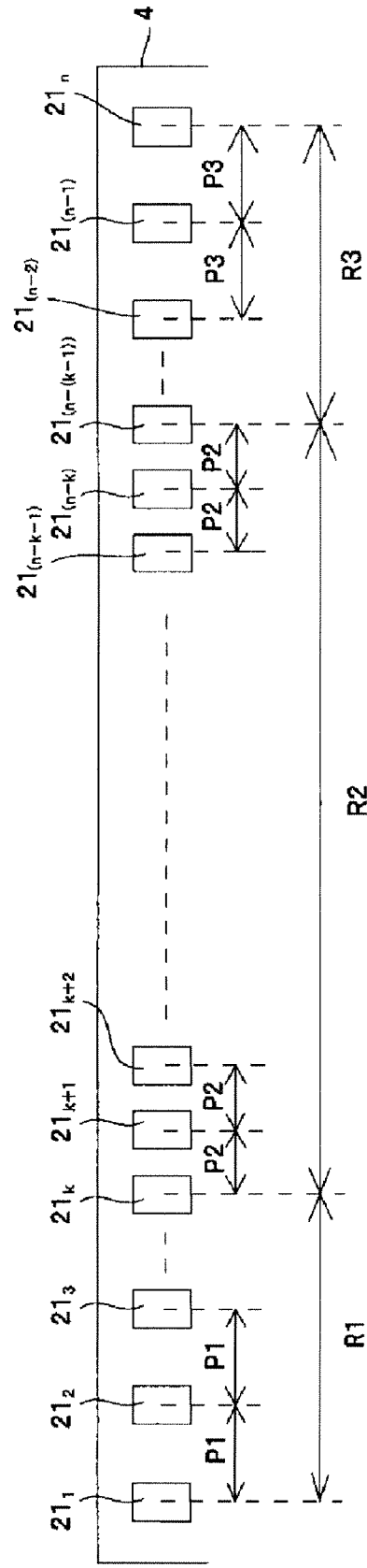
FIG. 4 is an explanatory diagram of an interval between pixels of the line sensor chip according to the first embodiment.

Next, an array of the pixels in the line sensor chip 4 is described. FIG. 4 is an explanatory diagram of the interval between pixels of one line sensor chip 4. Referring to FIG. 4, n pixels are arranged linearly on the line sensor chip 4.

In the figure, n is an integer, and represents the number of the pixels determined depending on a resolution. The number of the pixels of the line sensor chip 4 is therefore ensured in accordance with the resolution. The number of the pixels of the line sensor chip 4 is the number depending on the resolution in the following description, but may be equal to or more than the number calculated from the resolution as long as is at least the number depending on the resolution. This is because the number of the pixels of the line sensor chip 4 is determined in consideration of a lack of the pixel at the chip gap.

It is assumed a first number is the number calculated from the resolution, and a second number is the number of the pixels which compensates in one chip the lack of the pixel at the chip gap. In this specification, therefore, the number depending on the resolution includes the first number as well as the number of the first number plus the second number, the number being larger than the first number. If the number of the pixels is set depending on a required resolution, the line sensor chip 4 has the same resolution as the required resolution.

The line sensor chip 4 has a rectangular surface on which the plurality of pixels are provided. On the surface of the chip n pixels is arranged linearly along the scanning direction such as the following. That is, a pixel pitch in a pixel group of a center portion at a predetermined range R2 is shorter than a standard pitch. A pixel pitch in pixel groups on both sides of the center portion at predetermined ranges R1 and R3 is longer than the standard pitch.

Specifically, the pixel pitch is a distance between centers of photodiode-formed areas of two adjacent pixels. The standard pitch PS is a reading pitch of the image determined by resolution standards and is a so-called regular array pitch. Referring to FIG. 4, the pixel pitches P1 and P3 of the ranges R1 and R3 respectively in the both side portions out of n pixels are longer or wider than the standard pitch PS. The pixel pitch P2 of the range R2 between two ranges R1 and R3 is shorter or narrower than the standard pitch PS.

In the chip, n pixels are arranged from one end to the other end. In the range R1, the pixel group includes k pixels (k<n and k is an integer) from one end, that is from a pixel $21_i$ to a pixel $21_k$, and has a pixel pitch P1. Similarly, in the range R3, the pixel group includes k pixels from the other end (or pixels from the (n−(k−1))th pixel to the other end), that is from a pixel $21_n$ to a pixel $21_{(n-(k-1))}$, and has a pixel pitch P3. Here, the pixel pitch P1 is equal to the pixel pitch P3, and longer than the standard pitch PS. Further, in the range R2, the pixel group includes from the kth pixel $21_k$ to the pixel $21_{(n-(k-1))}$, and has a pixel pitch P2 which is shorter than the standard pitch PS.

In a case of the resolution of 1200 dpi (dot per inch), for example, the standard pitch PS of the pixel is 21.17 μm. In the first embodiment, the ranges R1 and R3 have the pixel pitches P1 and P3 respectively of 22.40 μm (>standard pitch PS), the range R2 has the pixel pitch P2 of 19.30 μm (<standard pitch PS).

It should be noted that an apparatus including the line sensor may be provided with, between an object to be read and the line sensor, an optical system such as a reducing optical system which changes magnification for the image. In such a case, the pixel pitch on the line sensor chip 4 is different from that calculated depending on the resolution and becomes a pitch magnified or reduced in accordance with the optical system. Therefore, on the line sensor chip 4, the standard pitch PS and the pixel pitch are determined on the basis of a length corresponding to the pixel pitch calculated from the resolution coupled with the magnification of the optical system. In the first embodiment and a second embodiment, the description is made for the case that the standard pitch PS is the same as the pixel pitch calculated from the resolution.

Next, the chip gap is explained.

Figure 5:
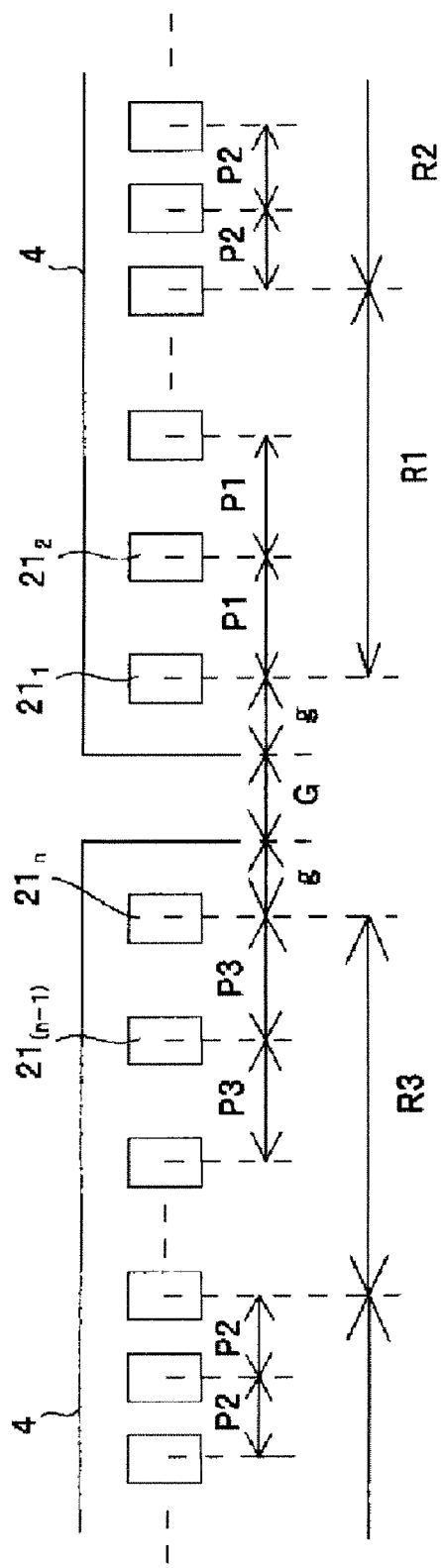
FIG. 5 is a diagram explaining a gap between two line sensor chips adjacent to each other.

FIG. 5 is a diagram explaining a gap between two line sensor chips 4 adjacent to each other. Referring to FIG. 5, the line sensor chips are produced by being cut in a dicing process or the like. The line sensor chips having subjected to the dicing process are placed such that the pixels are arranged linearly. The pixel $21_1$ of the relevant chip at one end is adjacent to a pixel $21_n$ of a preceding line sensor chip 4. The pixel $21_n$ of the relevant chip at the other end is adjacent to a pixel $21_1$ of a subsequent line sensor chip 4.

With the highly increased resolution in these years, the pixel pitch tends to be small. However, since the individual line sensor chips 4 are produced by cutting in the dicing process or the like, a length between the chips (hereinafter, referred to as a "chip gap") G is large compared to the pixel pitch.

Referring to FIG. 5, there is a case, for example, where the resolution is 1200 dpi, the chip gap G is from 30 μm to 50 μm due to irregularities on a cut surface of the chip at the end, and a distance g from the end of the chip to an end of the pixel is from 5 μm to 10 μm. In this case, a distance between the pixel $21_1$ of the chip and the pixel $21_n$ of the adjacent chip, that is, (G+2*g) is from 40 μm to 70 μm, thus being larger than the standard pitch PS (21.17 μm).

In the case that the distance between the pixels at the chip gap is so large as described above, the image distortion is highly visible with employing the second and third techniques described in the related art. However, in the case of the pixel pitch according to the first embodiment, the pixel pitches P1 and P3 at the end of the chip are made longer than the standard pitch PS, and shorter than the distance (G+2*g) between the chips at the chip gap, thus making the image distortion less visible.

In other words, in the first embodiment, in order to maintain the number n of the pixels depending on the resolution, the plurality of pixels are arranged on the line sensor chip 4 so that the pixel pitches are shorter in the pixel group of the center portion and longer in the pixel groups on both sides of the center portion than the standard pitch PS. As a result, according to the first embodiment, an advantage is obtained that the image distortion can be less visible at the chip gap with the pixel groups of both side portions having the long pixel pitch. Further, in addition to this configuration with the pixel group of the center portion having the short pixel pitch, the number of the pixel depending on the resolution can be ensured.

Now, modified examples of the first embodiment are described.

FIGS. 6 to 9 are diagrams explaining first to forth modified examples. In the above-described embodiment, the plurality of pixels are divided into three pixel groups with two kinds of pixel pitch. In the following modified examples, referring to FIG. 6 to FIG. 9, the plurality of pixels arranged linearly on one of the line sensor chips 4 are divided along the scanning direction into a plurality of regions, here five regions, that is regions R11, R12, R13, R14, and R15 of the pixel groups with three kinds of pixel pitch. It should be noted that the following modified examples are described with five regions and three kinds of pixel pitch, but may include further more regions and kinds of pixel pitch. According to the first to forth modified examples, the line sensor can be achieved which improves suppression of the image distortion due to the presence of the chip gap.

Figure 6:
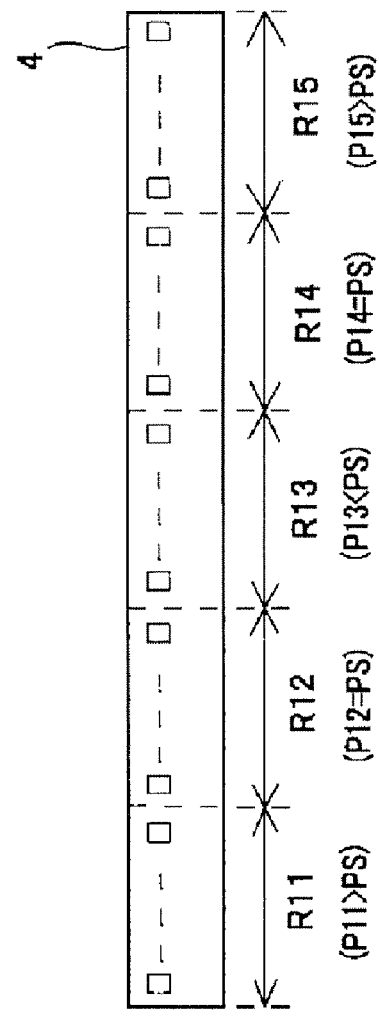
FIG. 6 is a diagram explaining a first modified example of the line sensor chip according to the first embodiment.

In the first modified example, referring to FIG. 6, the pixel pitches in the pixel groups of the individual regions are set as below. The region R13 of the center portion has a pixel pitch P13 shorter than the standard pitch PS (P13<PS). The regions R12 and R14 adjacent to the region R13 of the center portion have respectively pixel pitches P12 and P14 equal to the standard pitch PS (P12=PS, P14=PS). The regions R11 and R15 (outermost regions) respectively, outside of the regions R12 and R14, have pixel pitches P11 and P15 longer than the standard pitch PS (P11>PS, P15>PS). With such an arrangement there can be obtained the same advantageous effect as the above-described embodiment.

Figure 7:
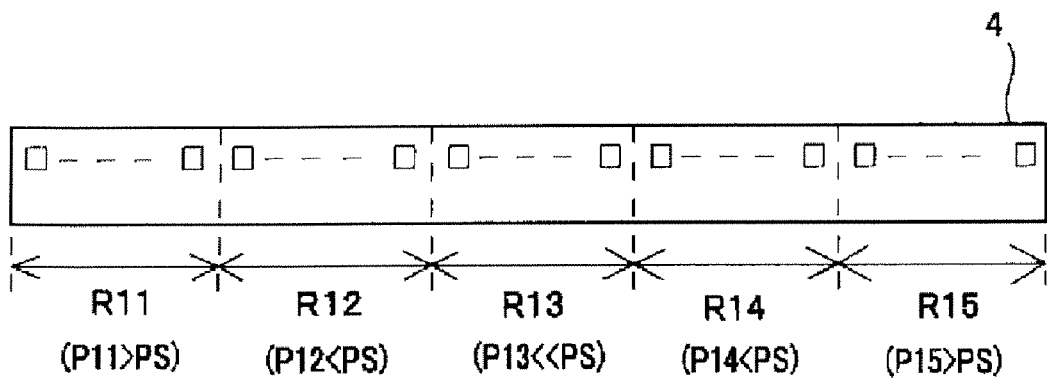
FIG. 7 is a diagram explaining a second modified example of the line sensor chip according to the first embodiment.

In the second modified example, referring to FIG. 7, the pixel pitches in the pixel groups of the individual regions are set as below. The regions R12 and R14 adjacent to the region R13 of the center portion have respectively the pixel pitches P12 and P14 shorter than the standard pitch PS (P12<PS, P14<PS). The region R13 of the center portion has the pixel pitch P13 shorter than the standard pitch PS and also shorter than the pixel pitches P12 and P14 (P13<<PS). The regions R11 and R15 (outermost regions) respectively, outside of the regions R12 and R14, have the pixel pitches P11 and P15 longer than the standard pitch PS (P11>PS, P15>PS). With such an arrangement also there can be obtained the same advantageous effect as the above-described embodiment.

Figure 8:
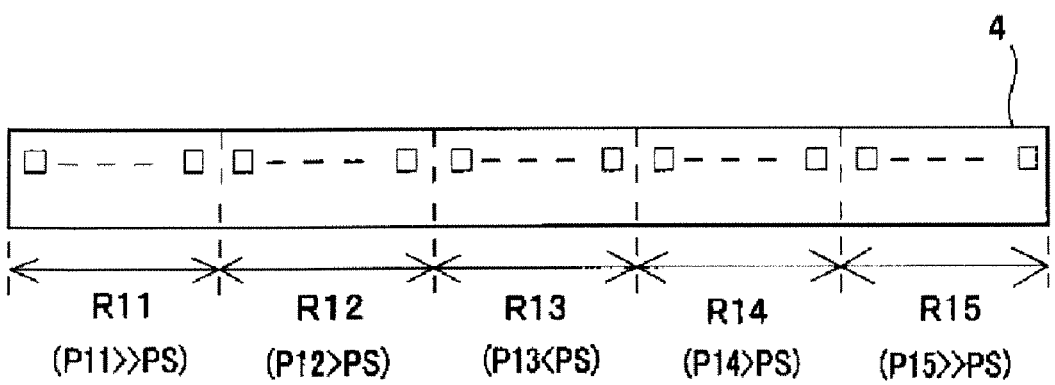
FIG. 8 is a diagram explaining a third modified example of the line sensor chip according to the first embodiment.

In the third modified example, referring to FIG. 8, the pixel pitches in the pixel groups of the individual regions are set as below. The region R13 of the center portion has the pixel pitch P13 shorter than the standard pitch PS (P13<PS). The regions R12 and R14 adjacent to the region R13 of the center portion have respectively the pixel pitches P12 and P14 longer than the standard pitch PS (P12>PS, P14>PS). The regions R11 and R15 (outermost regions) respectively, outside of the regions R12 and R14, have the pixel pitches P11 and P15 longer than the standard pitch PS (P11>PS, P15>PS), and also longer than the pixel pitches P12 and P14 (P11>>PS, P15>>PS). With such an arrangement still there can be obtained the same advantageous effect as the above-described embodiment.

Figure 9:
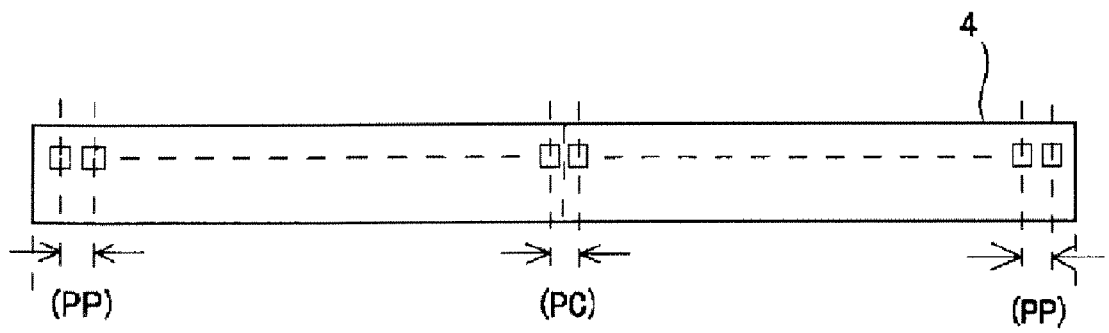
FIG. 9 is a diagram explaining a forth modified example of the line sensor chip according to the first embodiment.

In the forth modified example, referring to FIG. 9, the plurality of pixels may be arranged on the line sensor chip 4 such that the pixel pitch gradually widens or lengthens from the center portion toward the both end portions. Specifically, the pixel pitch of the center portion has a center pixel pitch PC shorter than the standard pitch PS (PC<<PS). The pixel pitch of each of the both end portions has a both end pixel pitch PP longer than the standard pitch (PP>>PS). Thus, the pixels are arranged so that the pixel pitch is increased gradually from the center portion toward the both end portions.

There are methods for arranging the plurality of pixels so that the pixel pitch is increased gradually from the center portion toward the both end portions. According to one method, the pixel pitch is changed continuously from the center portion toward the both end portions so as to be increased gradually. According to another method, the pixel pitch is changed stepwise or discontinuously from the center portion toward the both end potions so as to be increased gradually. With such an arrangement further there can be obtained the same advantageous effect as the above-described embodiment.

As described above, in this embodiment, the plurality of pixels are linearly arranged as follows. The pixel pitch in the pixel group of the center portion is shorter than the standard pitch PS. The pixel pitch in the pixel groups on both sides thereof is longer than the standard pitch PS. The arrangement of the plurality of pixels in such array ensures the number n of the pixels depending on the resolution to maintain the resolution on one chip, while reducing the image distortion at the chip gap between the adjacent chips.

Therefore, according to the first embodiment and the modified examples, the line sensor can be achieved which suppresses the image distortion owing to the presence of the chip gap in the plurality of line sensors arranged, and ensures the number of the pixels depending on the resolution.

Second Embodiment

Now, a second embodiment is described.

In the second embodiment the plurality of pixels are linearly arranged as follows. The pixel pitch in the pixel group of the center portion is shorter than the standard pitch PS. The pixel pitch in the pixel groups on both side portions is equal to the standard pitch PS. The arrangement of the plurality of pixels in such array ensures on one line sensor chip the number of the pixels depending on the resolution to maintain the resolution, while, at the chip gap between the adjacent chips, reducing the image distortion with the pixel pitch being changed from the center portion toward the both side portions on one chip. According to the second embodiment, a difference of resolution is decreased, making the image distortion less visible at the chip gap between the adjacent chips.

The second embodiment is different from the first embodiment only in the pixel pitches of the individual pixel groups. Therefore, the same component parts as those in the first embodiment are denoted by the same reference numerals and symbols, and the description thereof is omitted.

Figure 10:
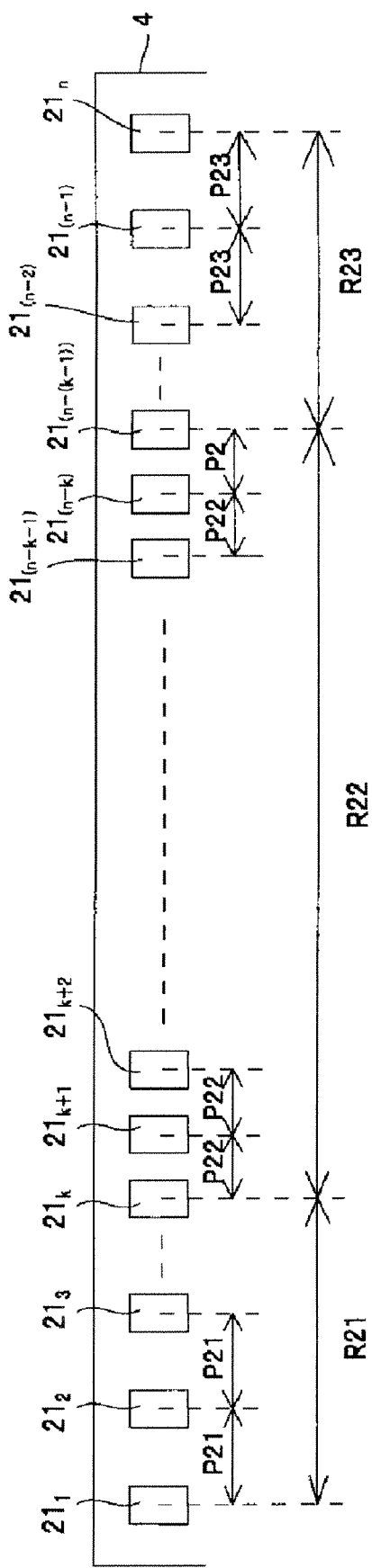
FIG. 10 is a schematic plan view of the line sensor chip according to a second embodiment.

FIG. 10 is an explanatory diagram of the interval between pixels of the line sensor chip 4 according to the second embodiment. Referring to FIG. 10, the pixel group of a range R22 of the center portion has a pixel pitch P22 shorter than the standard pitch PS. The pixel groups of ranges R21 and R23 on both sides of the center portion have respectively pixel pitches P21 and P23 equal to the standard pitch PS.

For example, the pixel pitches P21 and P23 are 21.17 μm (=standard pitch PS) in the pixel group of the ranges R21 and R23 respectively, and the pixel pitch P22 is 9.30 μm (<standard pitch PS) in the pixel group of the range R22.

With the arrangement of the plurality of pixels having the pixel pitch like this, each of the line sensor chips 4 includes the pixels of the number depending on the resolution or more to be enabled to obtain the pixel signals of the number depending on the resolution in an image processing.

The pixel pitch is longer in the pixel groups on both sides of the center portion than in the pixel group of the center portion, and changes gradually from the center portion via each of the both side portions toward the chip gap. Therefore, the image distortion at the chip gap between the adjacent chips can be made less visible.

Next, modified examples of the second embodiment are described.

Figure 11:
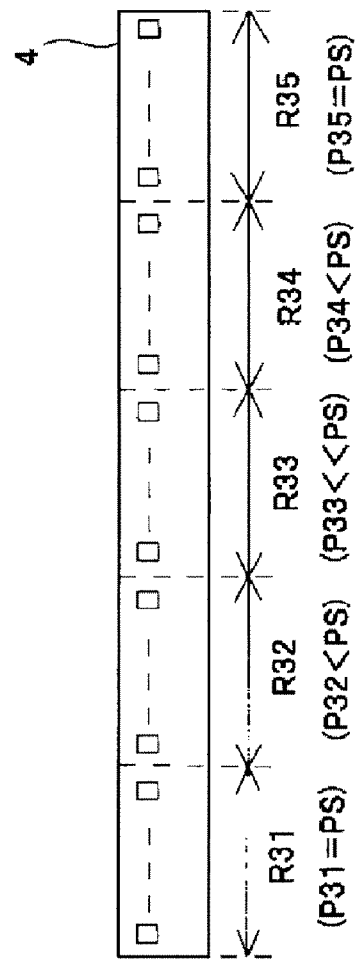
FIG. 11 is a diagram explaining a modified example of the line sensor chip according to the second embodiment.

FIG. 11 is a diagram explaining a first modified example of the second embodiment. Also here, referring to FIG. 11, the plurality of pixels arranged linearly on one of the line sensor chips 4 are divided along the scanning direction into a plurality of regions, here five regions, that is regions R31, R32, R33, R34, and R35.

Referring to FIG. 11, the pixel pitches in the pixel groups of the individual regions are set as below. The regions R32 and R34 adjacent to the region R33 of the center portion have respectively pixel pitches P32 and P34 shorter than the standard pitch PS (P32<PS, P34<PS). The region R33 of the center portion has a pixel pitch P33 shorter than the standard pitch PS and also shorter than the pixel pitches P32 and P34 (P33<<PS). The regions R31 and R35 (outermost regions) respectively, outside of the regions R32 and R34, have pixel pitches P31 and P35 equal to the standard pitch PS (P31=PS, P35=PS). With such an arrangement also there can be obtained the same advantageous effect as the above-described second embodiment.

In a second modified example, the plurality of pixels may be arranged such that the pixel pitch gradually widens or lengthens from the center portion toward the both end portions of the line sensor chip 4. The second modified example is explained with reference back to FIG. 9. Specifically, the pixel pitch of the center portion has the center pixel pitch PC shorter than the standard pitch PS (PC<<PS). The pixel pitch of each of the both end portions has the pixel pitch equal to the standard pitch. Thus, the pixels are arranged so that the pixel pitch is increased gradually from the center portion toward the both end portions.

Similarly to the forth example of the first embodiment, there are methods for arranging the plurality of pixels so that the pixel pitch is increased gradually from the center portion toward the both end portions. According to one method, the pixel pitch is changed continuously from the center portion toward the both end portions so as to be increased gradually. According to another method, the pixel pitch is changed stepwise or discontinuously from the center portion toward the both end portions so as to be increased gradually. With such an arrangement further there can be obtained the same advantageous effect as the above-described second embodiment.

As described above, according to the embodiments of the invention, the line sensor can be achieved which suppresses the image distortion owing to the presence of the chip gap in the plurality of line sensors arranged, and ensures the number of the pixels depending on the resolution. Therefore, an image reading apparatus can be realized which prevents the image distortion from occurring owing to the presence of the chip gap in the line sensors, by applying the line sensor chip according to two embodiments described above to the image information reading apparatus such as a facsimile.

The present invention is not limited to the above-described embodiments, but various changes and modifications can be made without varying the scope of the invention.

What is claimed is:

1. A line sensor, comprising:
   a plurality of pixels which is arranged linearly, the number of the plurality of pixels including the number depending on a resolution;
   a first pixel group which is provided to a center portion of the plurality of pixels arranged linearly and has a pixel pitch shorter than a length corresponding to a pixel pitch calculated from the resolution; and
   a second pixel group which is provided to each of both side portions of the center portion, and has a pixel pitch longer than the length corresponding to the pixel pitch calculated from the resolution.

2. The line sensor according to claim 1, wherein the number of the plurality of pixels is equal to the number depending on the resolution.

3. The line sensor according to claim 1, further comprising:
   a third pixel group which is provided between the center portion and each of the both side portions, and has a pixel pitch equal to the length corresponding to the pixel pitch calculated from the resolution.

4. The line sensor according to claim 1, further comprising:
   a third pixel group which is provided between the center portion and each of the both side portions, and has a pixel pitch shorter than the length corresponding to the pixel pitch calculated from the resolution and longer than a length corresponding to the pixel pitch of the center portion.

5. The line sensor according to claim 1, further comprising:
   a third pixel group which is provided between the center portion and each of the both side portions, and has a pixel pitch longer than the length corresponding to the pixel pitch calculated from the resolution and shorter than a length of the pixel pitch of the both side portions.

6. An image information reading apparatus comprising a line sensor according to claim 1.

7. A line sensor, comprising:
   a plurality of pixels which is arranged linearly, the number of the plurality of pixels including the number depending on a resolution, wherein the plurality of pixels are arranged linearly so that a pixel pitch is gradually increased from a center portion of the pixels arranged toward both side portions thereof; and
   a second pixel group which is provided between the center portion and each of the side portions, and has a pixel pitch shorter than a length corresponding to the pixel pitch calculated from the resolution and longer than a length of the pixel pitch of the center portion.

8. The line sensor according to claim 7, wherein the pixel pitch is changed continuously from the center portion toward the both end portions so as to be increased gradually.

9. The line sensor according to claim 7, wherein the pixel pitch is changed stepwise from the center portion toward the both end potions so as to be increased gradually.

10. A line sensor, comprising:
    a plurality of pixels which is arranged linearly, the number of the plurality of pixels including the number depending on a resolution;
    a first pixel group which is provided to a center portion of the plurality of pixels arranged linearly and has a pixel pitch longer than a length corresponding to a pixel pitch calculated from the resolution; and
    a second pixel group which is provided to each of both side portions of the center portion, and has a pixel pitch equal to the length corresponding to the pixel pitch calculated from the resolution.

* * * * *